(12) United States Patent
Green

(10) Patent No.: US 11,068,542 B2
(45) Date of Patent: Jul. 20, 2021

(54) SERVICEABILITY TRACKING SYSTEM

(71) Applicant: John Green, Los Angeles, CA (US)

(72) Inventor: John Green, Los Angeles, CA (US)

(*) Notice: Subject to any disclaimer, the term of this patent is extended or adjusted under 35 U.S.C. 154(b) by 208 days.

(21) Appl. No.: 16/191,785

(22) Filed: Nov. 15, 2018

(65) Prior Publication Data
US 2019/0146999 A1 May 16, 2019

Related U.S. Application Data

(60) Provisional application No. 62/586,723, filed on Nov. 15, 2017.

(51) Int. Cl.
| | | |
|---|---|---|
| *G06F 16/00* | (2019.01) | |
| *G06F 16/9035* | (2019.01) | |
| *G06F 16/9038* | (2019.01) | |
| *H04W 4/021* | (2018.01) | |
| *G06F 3/0484* | (2013.01) | |
| *G06Q 10/04* | (2012.01) | |
| *G06Q 30/02* | (2012.01) | |
| *G06Q 10/06* | (2012.01) | |
| *G06Q 50/00* | (2012.01) | |
| *G07C 11/00* | (2006.01) | |

(52) U.S. Cl.
CPC ...... *G06F 16/9035* (2019.01); *G06F 3/04847* (2013.01); *G06F 16/9038* (2019.01); *G06Q 10/04* (2013.01); *G06Q 10/06* (2013.01); *G06Q 30/0207* (2013.01); *G06Q 30/0282* (2013.01); *H04W 4/021* (2013.01); *G06Q 50/01* (2013.01); *G07C 2011/04* (2013.01)

(58) Field of Classification Search
CPC ............. G06F 16/9035; G06F 16/9038; G06F 3/04847; H04W 4/021; G06Q 10/04; G06Q 10/06; G06Q 30/0207; G06Q 30/0282; G06Q 50/01; G07C 11/00; G07C 2011/04
USPC ....................................................... 707/722
See application file for complete search history.

(56) References Cited

U.S. PATENT DOCUMENTS

| | | | | |
|---|---|---|---|---|
| 2009/0292582 A1* | 11/2009 | Ebert | ................. | G06Q 10/0639 705/7.38 |
| 2015/0301728 A1* | 10/2015 | Onozuka | ........... | G06F 16/24578 715/765 |
| 2018/0300739 A1* | 10/2018 | Ingle | ................. | G06Q 30/0202 |

* cited by examiner

*Primary Examiner* — Vincent F Boccio
(74) *Attorney, Agent, or Firm* — Karish & Bjorgum, PC

(57) ABSTRACT

A system for the management and reporting of serviceability at stores, restaurants, museums, entertainment venues or other locations 130, 140, 150, 160 is disclosed. The system comprises a serviceability information aggregator 125 working in conjunction with serviceability information agents which take the form of apps operating on smart phones, tablets, smart watches or other devices. The serviceability information aggregator 125 receives information from users 120 operating serviceability information agents related to serviceability parameters, such as wait time, line lengths, parking availability, or crowd size, aggregates the information into a serviceability score or scores, and communicates those on request to one or more users 120 via the application agent.

19 Claims, 7 Drawing Sheets

SERVICEABILITY TRACKING SYSTEM

BACKGROUND OF THE INVENTION

The present invention relates to a system, and method for the management and reporting of serviceability at stores, restaurants, museums, entertainment venues or other locations. The system enables potential customers, attendees, business owners and others to get information regarding the current or expected service at locations and for current customers, attendees, or others to provide information about expected service at locations. The system creates a ubiquitous information environment which may be accessed via context of an application or app operating on a wireless device, which allows the user to interoperate with a server that aggregates information regarding service to provide serviceability information to the user or receive updates on serviceability from the user.

SUMMARY OF THE INVENTION

The present invention, in at least one embodiment, relates to a system that aggregates and shares information regarding serviceability, e.g., wait times, line lengths, crowd size, parking availability and ease, staffing numbers and quality, and facility amenities, for stores, restaurants, museums, entertainment venues or other locations which serve users. Aggregated information is gathered, at least in part, from that reported by users reporting serviceability status at the locations. Serviceability information is compiled through a central server which allows for a central spot at which information from multiple sources and locations may be aggregated. Users who are providing information regarding serviceability at locations may provide this information. Information is aggregated into a single score, a Q-score, for overall serviceability, as well as, in some embodiments, Q-scores and other ratings for individual serviceability attributes.

Currently potential users seeking information about serviceability at locations that they may wish to attend are not able to get accurate and timely information regarding serviceability at locations they may be interested in visiting. At best available sources can only provide generic information about general conditions, e.g., frequently crowded or reservations recommended. With the present invention users may access focused and up-to-date serviceability information from the serviceability information repository and get information regarding serviceability criteria such as wait time, line length, crowd size, parking availability and ease, facilities, and staffing. The present invention also presents information that has been aggregated and presented in a more useful form as a serviceability score. Aggregation may occur in multiple dimensions including aggregation of information from multiple users, aggregation over multiple times, aggregation over multiple locations and aggregation over multiple serviceability criteria.

The system of the present invention also provides an improved user interface for managing or manipulating information regarding serviceability. Although general information about serviceability attributes may be available from other sources, including reviews, apps, and web sites, the information is not presented in a manner which aggregates the information or provides it in an improved manner allowing for quick comparison of serviceability information at different locations or at different dates and times. The system of the present invention provides a much improved, simpler and more efficient user interface for providing input regarding user experienced serviceability conditions. Simple interfaces will allow a user at a location to readily provide, actively (through data entry) or passively (automatically from a portable computing device), information about one or more serviceability criteria without the need to author a detailed description of the user experience as is required to communicate serviceability information at prior art review or information sites.

BRIEF DESCRIPTION OF THE DRAWINGS

The features, aspects and advantages of the present invention will become better understood with regard to the following description, appended claims and accompanying figures wherein:

DETAILED DESCRIPTION

In the following description of the preferred embodiments, reference is made to the accompanying drawings which show by way of illustration specific embodiments in which the invention may be practiced. Wherever possible, the same reference numbers will be used throughout the drawings to refer to the same or like parts. It is to be understood that other embodiments may be utilized and structural and functional changes may be made without departing from the scope of the present invention.

Figure 1:
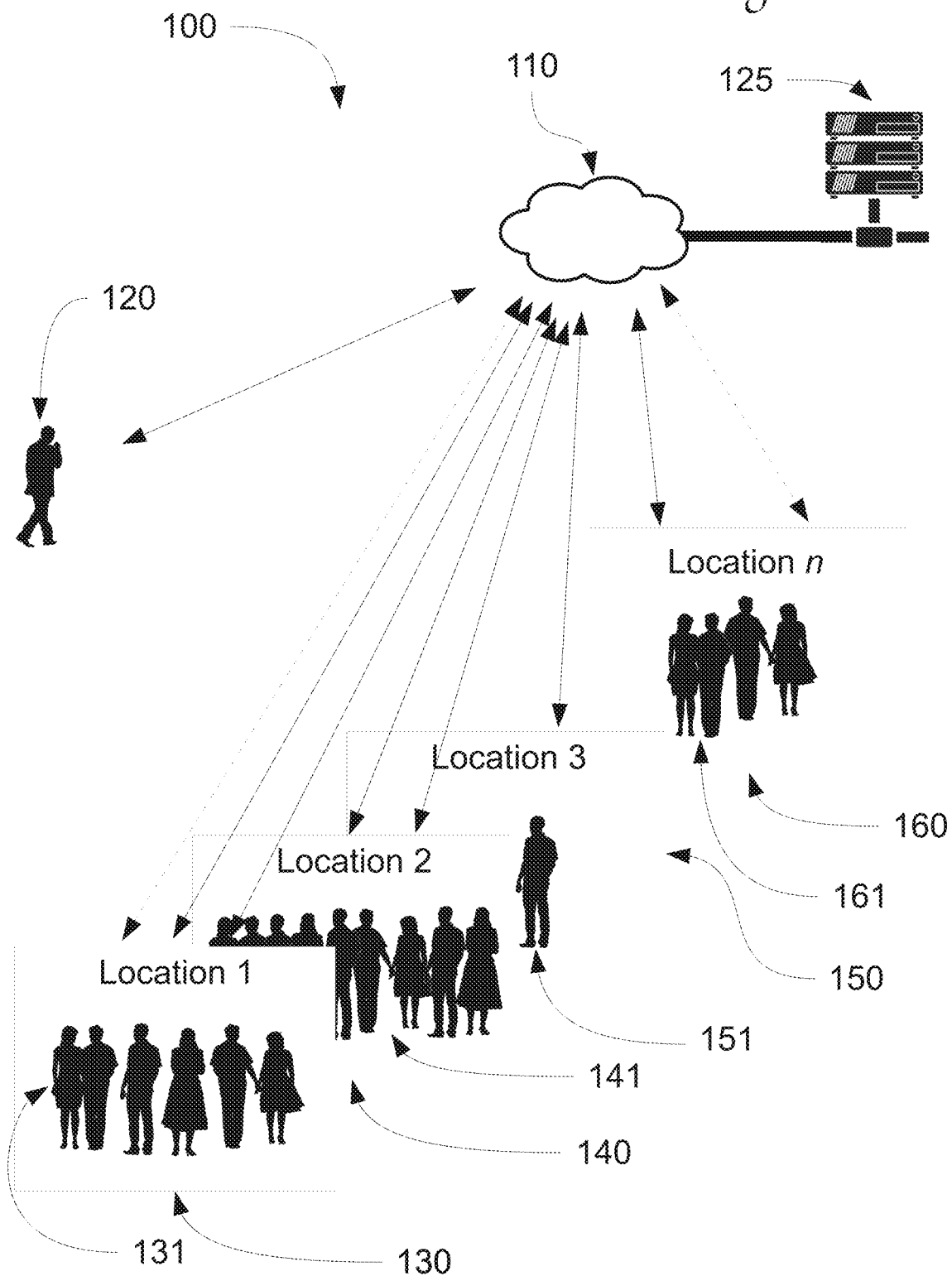
FIG. 1 is a schematic drawing of the operational environment and network of the present invention.

FIG. 1 illustrates an embodiment of operational environment 100 of the present invention. A potential user 120 is contemplating selection of a location to visit. He or she is in communication with a serviceability information aggregator 125 accessed through communication with the cloud 110, i.e., one or more wireless networks providing communication access to the Internet. This communication may, preferentially, be achieved with a portable computing device capable of wireless communication such as a smart phone, smart watch, or tablet, but may also be performed through a desktop computing device, each of which may operate as an agent of the overall system.

Information regarding serviceability parameters, e.g., crowd size, line length, and wait times, about a number of locations 130, 140, 150, 160 is provided to the serviceability information aggregator 125 from persons in, or who were in, attendance 131, 141, 151, 161 at each location 130, 140, 150, 160, respectively. The persons in attendance 131, 141, 151, 161 can provide information regarding serviceability parameters via agent devices including mobile wireless devices, such as smart phones, smart watches, or tablets which connect to the serviceability information aggregator 125 via wireless connections to the cloud 110. The mechanism by which the potential user 120 receives information regarding serviceability and the persons in attendance 131, 141, 151, 161 at the locations 130, 140, 150, 160 and provides information regarding serviceability is, in the preferred embodiment an agent app which operates on the portable computing device and serves as interface agent for the system.

Figure 2:
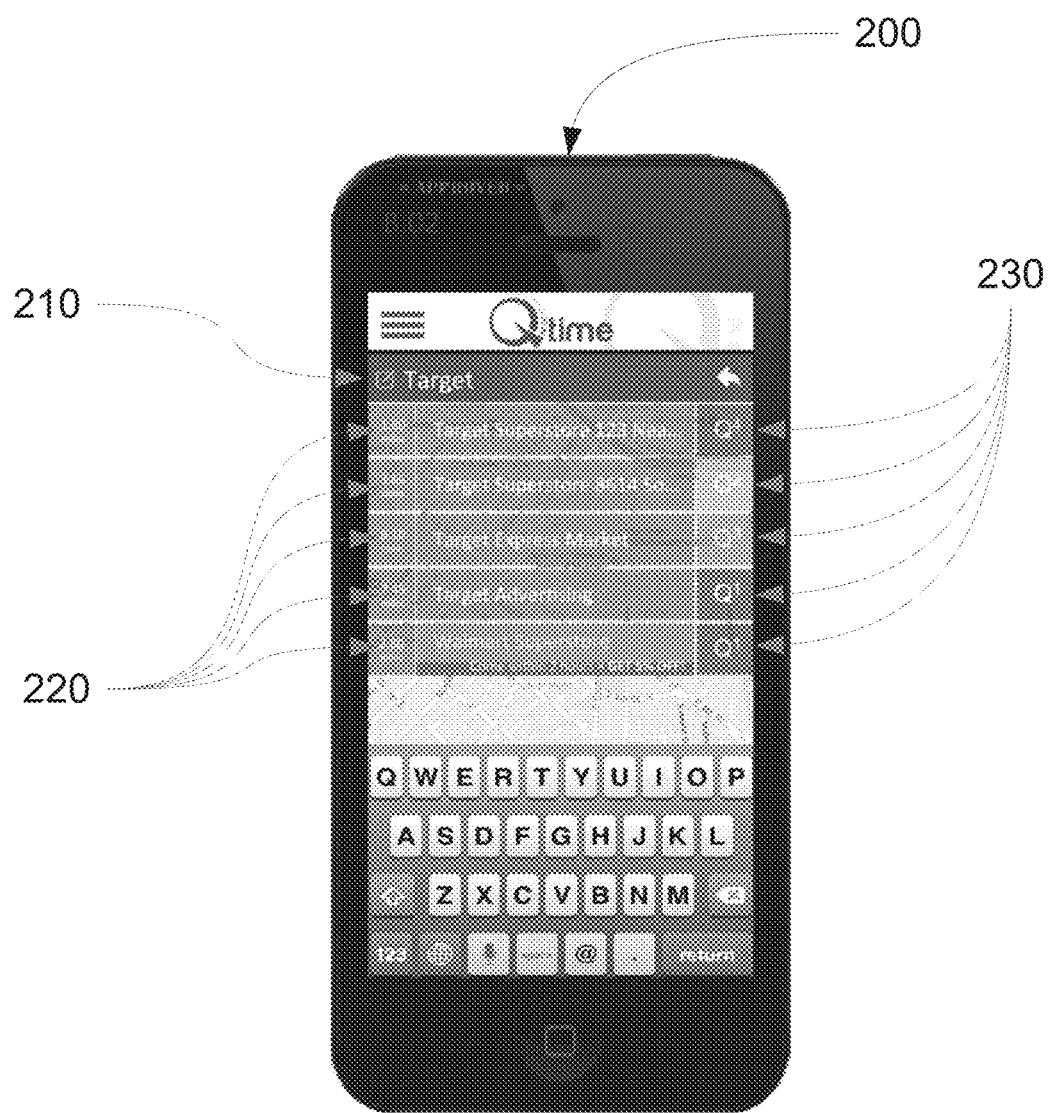
FIG. 2 is an illustration of a search screen for a serviceability agent in the present invention.

FIG. 2 illustrates a search screen for an agent app operating on a smartphone 200 in an embodiment of the present invention. The agent app provides an input field 210 for input of the name of a desired store, restaurant, business, event, or entertainment venue. Upon entering the search term into the input field 210, it is communicated to the serviceability information aggregator 125, where locations responsive to the search term are identified. In a preferred embodiment, the hand-held device will provide location information to the agent app so that the nearest locations may be shown as well as, optionally, the distances to the location. For each possible search result a Q-score 230, relating to serviceability is given. The Q-score 230 is based upon information possessed by the serviceability information aggregator about service conditions at each location. This may include conditions such as line length, crowd size, wait time, parking availability and ease, facility amenities, staffing size and performance. In an embodiment of the invention, the Q-score 230 may be as simple as the average of scores given on a 1 through 4 basis (1 being best, 4 being worst) from app users who have reported on the service conditions at the location during the recent past. Q-scoring, however may, in some embodiments, be far more complex allowing for a wider range, greater fidelity, and more choices in attributes receiving user scores. Further the generation of the aggregate Q-score may be more complex, including functions which are dependent on the type of facility, time of day, day of week, or individual user preferences. This might, in some embodiments, allow for individual users who are searching for locations to specify how to create the average Q-score based on their personal preferences or from a user selectable pre-defined set of serviceability weighting functions. For example, a person who doesn't mind long waits, but abhors crowds could create a Q-score function attuned to his or her personal preferences. It would be apparent to one of ordinary skill in the art, that alternative scoring systems could be used with different score ranges and functional relationships. The calculation and presentation of Q-scores provides an improvement in the display of serviceability data to the user in that it may aggregate information regarding different categories of serviceability information into a single metric by which a user may more quickly and more effectively evaluate and compare serviceability at different locations.

Figure 3:
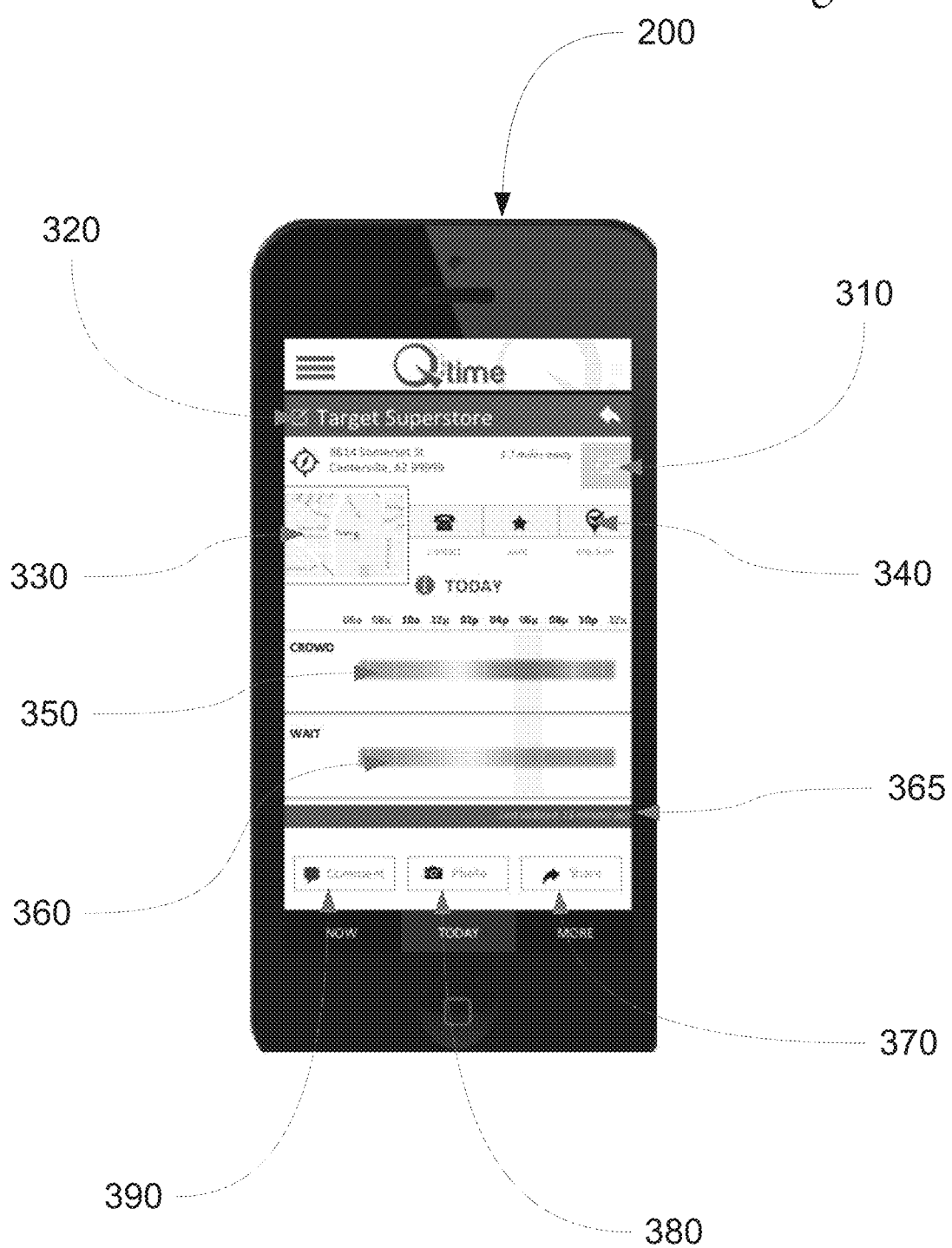
FIG. 3 is an illustration of an information screen for a serviceability agent in the present invention.

FIG. 3 illustrates an information screen on a smartphone for a location selected from the search screen for an embodiment of the invention. The screen, displayed on a smartphone 200 displays the name of the location selected 320, the Q-score 310 of the location displayed both quantitatively and with a color-coded icon. A map 330 showing the geographic location of the selected location is shown. In this embodiment, the agent app provides ways to handle the information including the ability to call the location, save the location information, or check in with the location 340 directly from the app. In some embodiments, the app will cooperate with selected navigation tools allowing for the location to be opened directly in the navigation app. Information about crowds 350 and wait time 360 about the location are provided based on current and historical data known to the serviceability information aggregator. The date and time at which the serviceability information aggregator was last updated with information is provided 365, so that a user may assess the timeliness of the information. The app is configured, preferentially, to include links to social media functionality including the ability to share 370 the information, see photos 380, and comment 390. Thus, in this embodiment, data regarding serviceability parameters are presented to the user in a more efficient manner integrated with the display of other information and with the ability to take actions regarding the services offered at the location.

Figure 4:
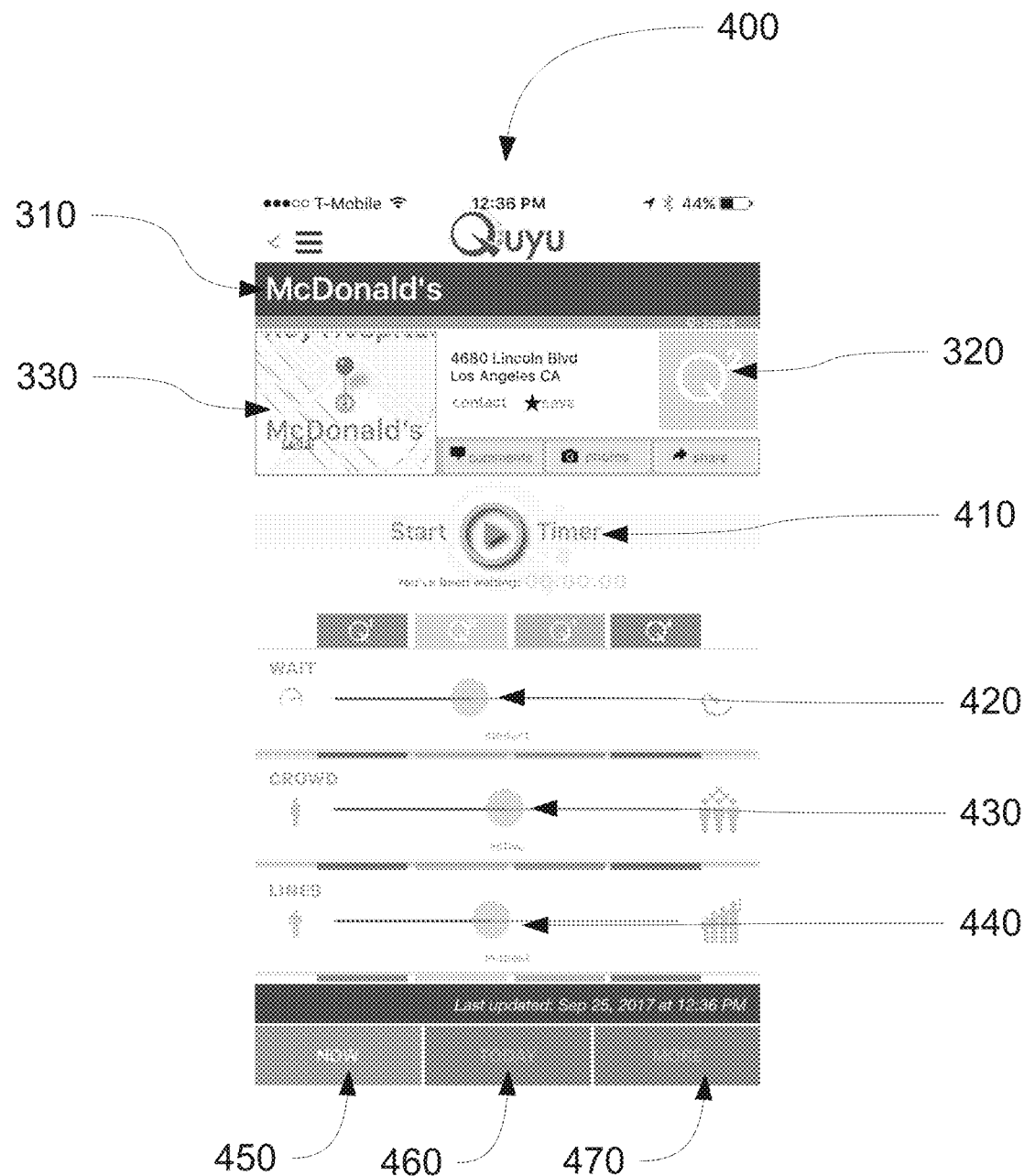
FIG. 4 is an illustration of information input screen for a serviceability agent in the present invention.

FIG. 4 illustrates the layout of an information input screen for an embodiment of the present invention. The information input screen 400 may be used by someone who is at a location to provide information regarding the serviceability conditions at the location. The screen layout 400 includes the name of the location 310, the geographic map information 330, and the total Q-score 320. Additionally, the screen 400 provides an interface to a timer 410, by which a user may accurately track his wait time and sliders by which a user may input serviceability ratings for wait time 420, crowd size 430, and line lengths 440. The input screen may preferentially provide textual reminders to the user of the meanings for the entry of the serviceability condition. Preferentially, the screen may indicate that it is prepared to accept serviceability information by the highlighting of the NOW indicator 450. The user may use inputs, which in a preferred embodiment are implemented as sliders to enter information about service conditions. After the user settles on service condition inputs, they are transmitted to the serviceability information aggregator. The system may use the location data retrieved from the smart phone or tablet to ensure that the user is inputting information for a location where the user is or has recently been. If the user is not currently at the location for which he or she has input data, but has recently been at that location, the data will be treated by the serviceability information aggregator as having been input for the time when the user was at the location. In this manner, the user interface for seeing the current status of serviceability parameter is integrated efficiently with the ability to input user data regarding serviceability and related information regarding the location and engagement with services offered at the location. Additionally, the serviceability information aggregator may, preferentially, include algorithms to identify statistical outliers in the scores from reporting users and de-weight them accordingly. This serves to avoid the input of fraudulent information or having businesses attempt to corrupt the accuracy of the Q-score at a competitor location. Using the serviceability information input by the user, the service information aggregator will generate an updated Q-score for the location.

From the input screen, the user may also select to query information from the serviceability information aggregator regarding the serviceability and Q-scores ratings at the location at some other time today 460, or on some other date 470.

Figure 7A:
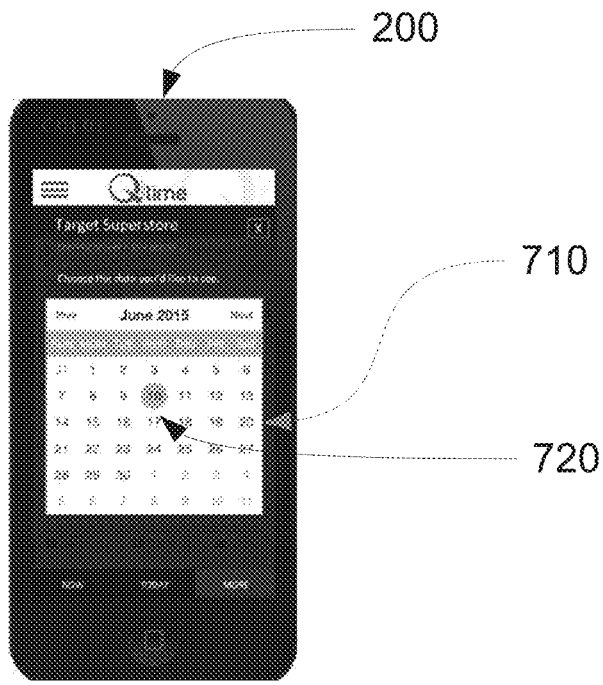
FIG. 7A is an illustration of the calendar selection of a screen for access to serviceability information from a serviceability agent in the present invention.
Figure 7B:
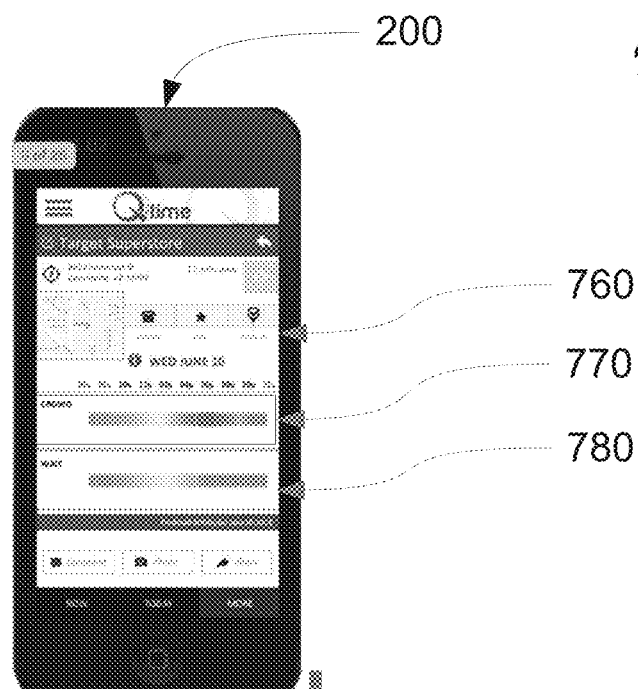
FIG. 7B is an illustration of a screen for access to serviceability information from a serviceability agent in the present invention.

FIGS. 7A and 7B illustrates the screens on the smartphone 200 for an embodiment of the invention that can allow access to serviceability information for other times on other days. FIG. 7A illustrates the calendar selection display on a smartphone 200, when the user seeks information regarding a location at another time by selecting the MORE button 470. A calendar display 710, allows the user to select the desired date by selecting a date from the screen, which will be indicated 720. After selecting the date of interest, the user is directed to an information screen 760 that preferentially shows visually the variation of Q-score for serviceability parameters such as crowd size 770 and wait time 780 over the course of the day. If the user selects the TODAY button 460, they would be directed to the TODAY view screen for the location, as illustrated for an embodiment of the invention in FIG. 3.

Figure 5:
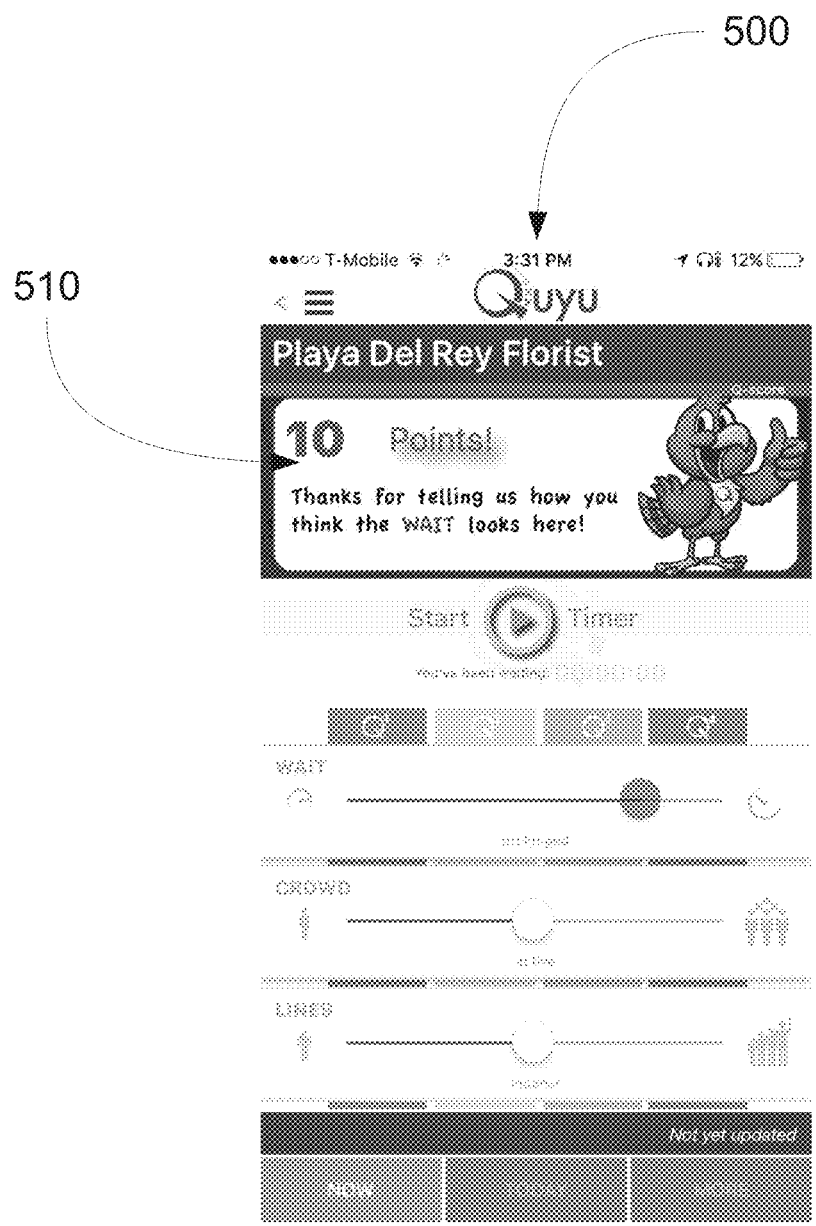
FIG. 5 is an illustration of screen for a serviceability agent in the present invention reflecting the awarding of points to the user.

In response to entering information regarding the serviceability conditions for a location, the user may be awarded with points as illustrated in FIG. 5. After entering information regarding a location, a screen display 500 including a notice 510 that the user has received points for providing information about the location. The points awarded may be redeemable for items or services of benefit to the user, including discounts or better offers at participating locations, the unlocking of new features or advanced levels of the application, or cash rewards.

Figure 6:
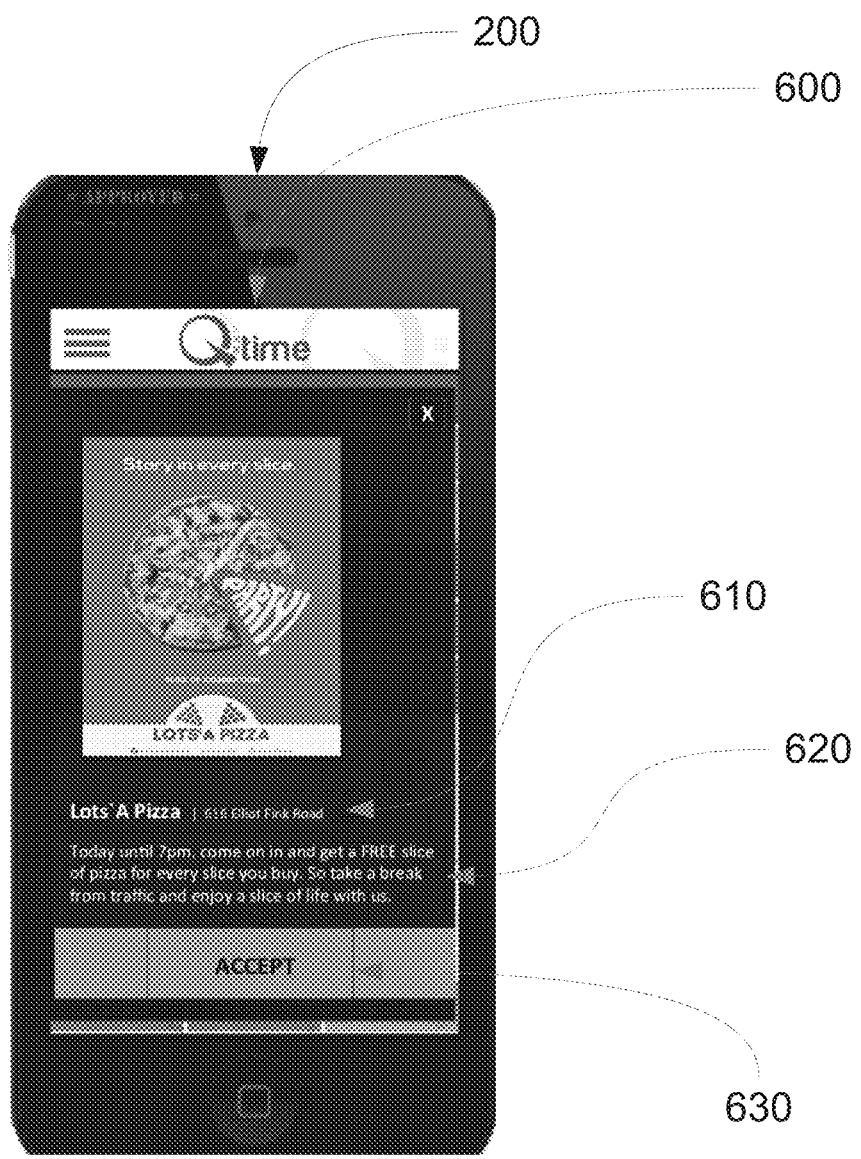
FIG. 6 is an illustration of a user offer screen for a serviceability agent in the present invention.

FIG. 6 illustrates a user offer screen 600 displayed on a smart phone 200 in an embodiment of the invention. The screen 600 presents an offer 620 from a location, which the user may accept via a button 630 on the smart phone app. An offer screen may be presented based upon points accrued by the user or as a result of a promotion by a participating location. The source of the offer may, in some embodiments be dependent upon factors such as the time of day, the user's past history of visiting locations, or the user's current location.

There is disclosed in the above description and the drawings, an apparatus, and method for simplifying and improving the process of aggregating, managing, and disseminating serviceability information that fully and effectively overcomes the disadvantages associated with the prior art. However, it will be apparent that variations and modifications of the disclosed embodiments may be made without departing from the principles of the invention. The presentation of the preferred embodiments herein is offered by way of example only and not limitation, with a true scope and spirit of the invention being indicated by the following claims.

What is claimed is:

1. A system for service information aggregation comprising:
   a service information aggregator;
   a plurality of application agents, each operating on a portable computing device;
   wherein one or more of the plurality of application agents communicates information regarding serviceability at one or more locations to the service information aggregator;
   wherein the service information aggregator generates a serviceability score for the one or more locations from the information regarding serviceability reported by the one or more of the plurality of application agents;
   wherein the serviceability score is a single functional score based upon inputs from a plurality of application agents regarding a plurality of: line length, crowd size, wait time, parking availability, parking ease, facility amenities, staffing size and staffing performance;
   wherein the serviceability score is communicated to one or more of the application agents; and
   the one or more application agents generate a display screen on a portable computing device that displays the serviceability score.

2. The system for service information aggregation of claim 1, wherein each application agent generates a display screen on the portable computing device to allow a user to input information assessing serviceability at a location.

3. The system for service information aggregation of claim 2, wherein the user inputs information assessing serviceability by use of a graphical user interface.

4. The system for service information aggregation of claim 3, wherein the input of information regarding serviceability by use of the graphical user interface does not require the input of numerical or textual information that assesses serviceability.

5. The system for service information aggregation of claim 4, wherein the graphical user interface utilizes sliders for input of information that assesses serviceability.

6. The system for service information aggregation of claim 4, wherein the graphical user interface utilizes a timer for input of information that assesses serviceability.

7. The system for service information aggregation of claim 1, wherein the display screen on a portable computing device displays the serviceability score as a single numeric value.

8. The system for service information aggregation of claim 1, wherein the display screen on a portable computing device displays the serviceability score as a color code.

9. The system for service information aggregation of claim 1, wherein the display screen on a portable computing device displays a time history of serviceability scores.

10. The system for service information aggregation of claim 1, wherein the serviceability score is dependent on a type of facility.

11. The system for service information aggregation of claim 1, wherein the serviceability score is dependent on individual user preferences.

12. A serviceability information agent in a system for service information aggregation,
   wherein the serviceability information agent is configured on a portable computing device including a display;
   wherein the serviceability information agent can generate one or more user input interface screens on the display of the portable computing device;
   wherein at least one of the one or more user input interface screens accepts user input assessing serviceability conditions for a plurality of serviceability parameters at a location;
   wherein the serviceability information agent can communicate wirelessly with a service information aggregator;
   wherein the serviceability information agent can generate one or more user output interface screens on the display screen of the portable computing device; and
   wherein the one or more user output interface screens display a serviceability score received from the service information aggregator, the serviceability score being a single functional score based upon inputs from a plurality of application agents regarding a plurality of: line length, crowd size, wait time, parking availability, parking ease, facility amenities, staffing size and staffing performance.

13. The serviceability information agent of claim 12, wherein the serviceability score reflects aggregate information regarding different categories of serviceability parameters.

14. The serviceability information agent of claim 12, wherein the serviceability score is displayed in a graphical user interface in the one or more user output interface screens as a numeric value.

15. The serviceability information agent of claim 12, wherein the serviceability score is displayed in a graphical user interface in the one or more user output interface screens as a color code.

16. The serviceability information agent of claim 12, wherein the user input assessing serviceability conditions for one or more serviceability parameter at a location is input via a slider in a graphical user interface in the at least one of the one or more user input interface screens.

17. The serviceability information agent of claim 12, wherein the user input assessing serviceability conditions for one or more serviceability parameter at a location is input via a timer in a graphical user interface in the at least one of the one or more user input interface screens.

18. The system for service information aggregation of claim 12, wherein the serviceability score is dependent on a type of facility.

19. The system for service information aggregation of claim 12, wherein the serviceability score is dependent on individual user preferences.

\* \* \* \* \*